UNITED STATES PATENT OFFICE.

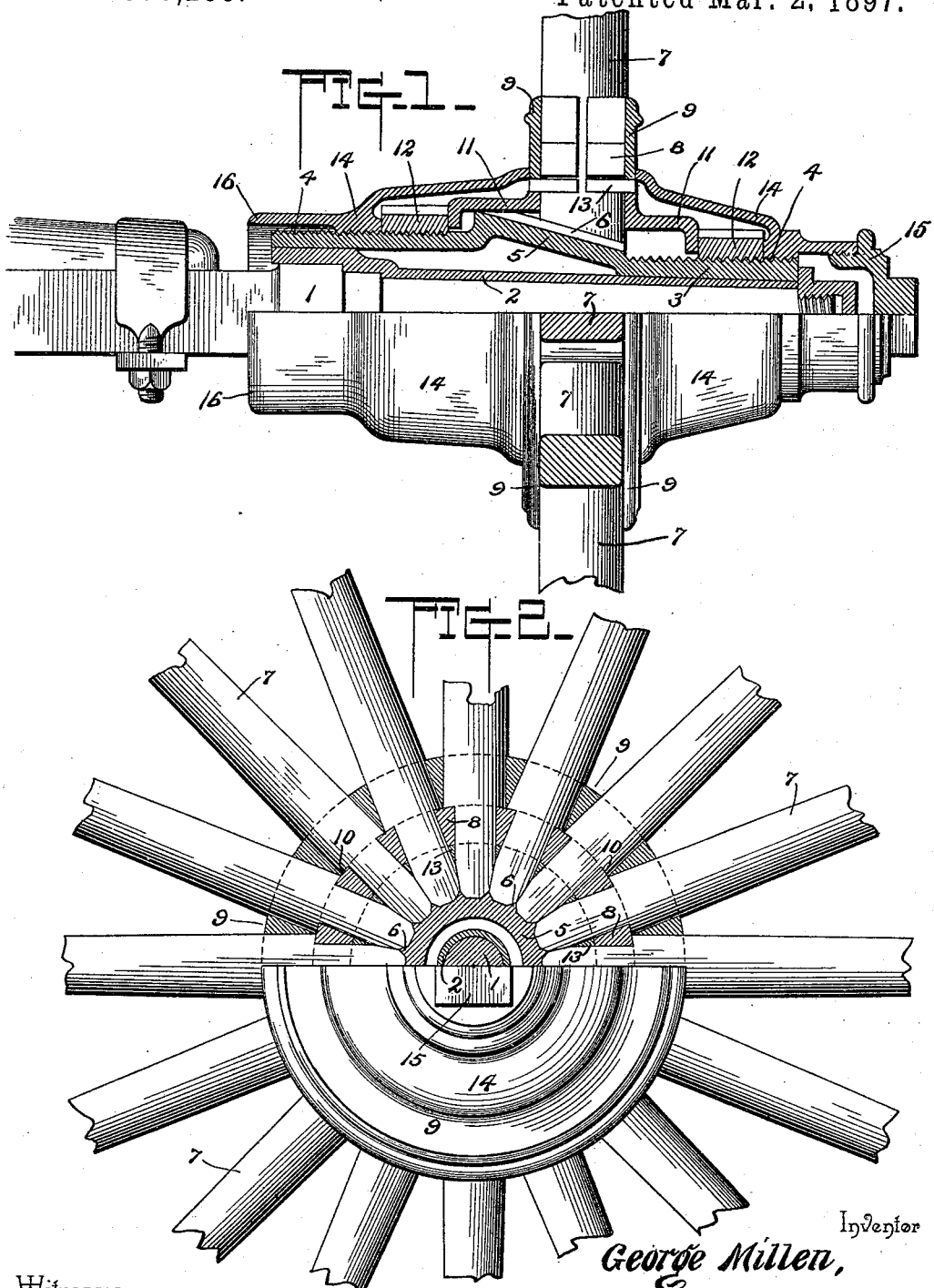

GEORGE MILLEN, OF SAN ANTONIO, TEXAS.

HUB.

SPECIFICATION forming part of Letters Patent No. 578,255, dated March 2, 1897.

Application filed July 29, 1896. Serial No. 600,933. (No model.)

*To all whom it may concern:*

Be it known that I, GEORGE MILLEN, a citizen of the United States, residing at San Antonio, in the county of Bexar and State of Texas, have invented a new and useful Hub, of which the following is a specification.

This invention relates to wheel-hubs, and has for its object to provide means connected with the hub by which the spokes may be forced radially outward, so as to tighten the same and avoid the necessity of shrinking the tire.

The present invention also provides for preventing circumferential movement of the inner ends of the spokes, for bracing the spoke-engaging spider, and for locking the spoke-tightening device for preventing the accidental loosening thereof.

Other objects and advantages will appear in the course of the subjoined description.

The invention consists in an improved wheel-hub embodying certain novel features and details of construction and arrangement of parts, as hereinafter fully described, illustrated in the drawings, and incorporated in the claims.

In the accompanying drawings, Figure 1 is a longitudinal section, partly in elevation, of a wheel-hub constructed in accordance with the present invention. Fig. 2 is an end view thereof, partly in section.

Similar numerals of reference designate corresponding parts in both figures of the drawings.

1 designates an axle, and 2 an axle-box of any preferred construction, forming a removable part of the improved wheel-hub. Surrounding the axle-box 2 is a sleeve 3, having externally-threaded end portions 4 of varying diameter and an intermediate circumferential conical seat 5, provided at intervals with radially-projecting V-shaped ribs 6.

7 designates a series of spokes, the inner ends of which are beveled, as shown, and also notched to engage the ribs 6 for preventing circumferential movement of the inner ends of the spokes around the conical seat 5. The inner ends of the spokes 7 are received between spaced inwardly-projecting lugs or webs 8 on an opposing pair of rings 9, which together form the spoke-holding spider, but the latter may be constructed of a single piece of metal instead of two sections, if desired. The webs 8 are so arranged as to underlie the opposite shoulders 10 of each spoke and are of a shape in cross-section adapted to fill the spaces between the reduced inner ends of the spokes.

11 designates a pair of washers of angular or double-L shape in cross-section. These washers lie upon opposite sides of the spokes, confining the latter between them when moved up to place and are actuated and held at any point of adjustment by means of a pair of nuts 12, arranged outside thereof. These washers are provided at their adjacent sides with circumferential flanges, and from these flanges a series of webs or lugs 13 project inwardly toward each other and engage between the spoke ends, the webs 13 being preferably tapered to admit of their easy insertion and removal.

Arranged outside of the washers 11 and nuts 12 are outer casings 14 in the form of sleeves, tapering from the center of the hub, where they are largest in diameter, to the ends of said hub. These sleeves bear at their inner edges against the spider 9 and are internally threaded near their outer ends to engage the threaded ends of the sleeve 4, above described, the said outer casings thus serving to inclose the washers and nuts and prevent the admission of dirt and other foreign matter thereto, and also acting as lock-nuts for preventing the unthreading or loosening of the nuts 12. The outer casing-section inclosing the outer end of the hub is extended longitudinally to form an internally-threaded flange, into which is screwed a dust-cap 15, and the inner end of the casing at the opposite end of the hub is also extended beyond the inner end of the sleeve 4 to form a mud or sand guard 16.

The hub in Fig. 1 of the accompanying drawings is shown located at the right-hand side of a vehicle, and the screw-threads at the outer end of the hub are right-hand screw-threads, so that the parts are tightened by screwing them in the direction of the rotation of the wheel, so that the latter cannot operate to loosen the parts when the vehicle is moving forward, and left-hand screw-threads are provided at the inner end of the hub, so that the parts screwing on the sleeve at the inner end of the hub will be rotated in the direction of the rotation of the wheel to tighten them. The hubs at the opposite side of the vehicle will be reversely threaded, so that the parts in screwing on the sleeve will turn in the direction of the rotation of the wheel.

From the foregoing description it will be seen that by removing the outer case-sections 14 access may be had to the nuts 12, and in the event of the spokes becoming loose these nuts may be respectively loosened and tightened, so as to cause the washers to force the inner beveled ends of the spokes longitudinally on the conical seat 5, whereupon the spokes will be forced radially outward and firmly jammed between said conical seat and the felly-sections. When sufficiently tightened, both nuts 12 are set fast and afterward the outer case-sections 14 are screwed to place, thus inclosing the washers and nuts, giving a finished appearance to the hub, and locking the adjusting-nuts 12 against displacement. A hub constructed in this manner is strong and durable, cheap in manufacture, less time is required to set up a complete wheel, and in the event of the spokes becoming loose the same may be readily and quickly tightened, thus obviating the necessity for shrinking the metal tire.

It will be understood that various kinds of material may be employed in the construction of the hub, that any desired finish may be given thereto, and that the same is susceptible of other changes in the form, proportion, and minor details of construction, which may accordingly be resorted to without departing from the spirit or sacrificing any of the advantages of this invention.

Having thus described the invention, what is claimed as new is—

1. In a wheel-hub, the combination of an axle-box, a sleeve surrounding the same and having its ends threaded and provided at an intermediate point with a conical seat, a spider extending around the seat and composed of two sections or rings provided with inwardly-extending lugs, spokes arranged in the spider and engaging said seat, washers arranged at each side of the spoke ends, nuts arranged on the ends of the sleeve for adjusting said washers, and the outer casings threaded on the sleeve and engaging the sections or rings of the spider, substantially as described.

2. In a wheel-hub, the combination of an axle-box, a sleeve surrounding the same, having its ends threaded and provided at an intermediate point with a conical seat, a spider surrounding the seat, spokes fitted in the spider and engaging said seat, washers arranged at the inner ends of the spokes and engaging the same at opposite sides of the hub, said washers being double-L-shaped in cross-section, adjusting-nuts arranged on the threaded portions of the sleeve and engaging the washers, and means for supporting the spider, substantially as described.

3. In a wheel-hub, an axle-box, and a sleeve surrounding the same and having its opposite ends threaded and provided at an intermediate point with a conical seat, in combination with a spider extending around said seat, spokes fitted therein and having beveled ends for engaging said seat, washers arranged at each side of the spoke ends, nuts on the ends of the sleeve for adjusting said washers, and the outer casing-sections inclosing the washers and nuts and bearing against said spider, the outer ends of said sections having a threaded engagement with said sleeve and bearing against said nuts and serving as lock-nuts therefor, substantially as described.

In testimony that I claim the foregoing as my own I have hereto affixed my signature in the presence of two witnesses.

GEORGE MILLEN.

Witnesses:
   LOUIS BERGSTROM,
   J. G. SCHODTS.